US009086935B2

(12) United States Patent
Budai et al.

(10) Patent No.: US 9,086,935 B2
(45) Date of Patent: Jul. 21, 2015

(54) ACCESSING BUSINESS OBJECT RESOURCES FOR A MACHINE-TO-MACHINE COMMUNICATION ENVIRONMENT

(71) Applicant: INTERNATIONAL BUSINESS MACHINES CORPORATION, Armonk, NY (US)

(72) Inventors: Henadz Budai, Minsk (BY); Stefan A. Freund, Munich (DE); Nadia Latif, Munich (DE); Patrick Pissang, Munich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/537,237

(22) Filed: Nov. 10, 2014

(65) Prior Publication Data

US 2015/0135197 A1    May 14, 2015

(30) Foreign Application Priority Data

Nov. 12, 2013  (GB) .................................. 1319895.7

(51) Int. Cl.
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |
| H04L 29/08 | (2006.01) |

(52) U.S. Cl.
CPC ................ G06F 9/546 (2013.01); G06F 9/465 (2013.01); G06F 9/542 (2013.01); H04L 67/02 (2013.01)

(58) Field of Classification Search
None
See application file for complete search history.

(56) References Cited

U.S. PATENT DOCUMENTS

| 6,167,448 | A | 12/2000 | Hemphill et al. |
| 6,829,770 | B1 | 12/2004 | Hinson et al. |
| 7,437,417 | B2 | 10/2008 | Reynolds et al. |
| 7,496,687 | B2 | 2/2009 | Griffin et al. |
| 8,027,922 | B2 | 9/2011 | Lee |
| 8,037,133 | B2 | 10/2011 | Irassar et al. |

(Continued)

OTHER PUBLICATIONS

N. Erasala et al., "Enterprise Application Integration in the Electronic Commerce World", Elsevier B.V., Science Direct, Computer Standards & Interfaces, vol. 25, No. 2, May 2003, pp. 69-82 (Abstract Only).

(Continued)

*Primary Examiner* — Craig Dorais
(74) *Attorney, Agent, or Firm* — Law Office of Jim Boice

(57) ABSTRACT

Business object resources are accessed by a consumer application via web protocol. A business event occurring in a provider business application, which the consumer application is authorized to subscribe to, is identified. Each identified business event is assigned to a corresponding business object resource. Access to the business object resource is implemented as a RESTful application programming interface call. A uniform resource identifier is generated for accessing the business object resource affected by an occurring defined business event. At least one event message is created for the occurring defined business event, such that the event message includes the uniform resource identifier. The event message is published to all subscribed consumer applications that are identified as being interested in contextual information of the occurred business event, thereby enabling the calling of the RESTful application programming interface and to access the affected business object resource.

20 Claims, 6 Drawing Sheets

(56) References Cited

U.S. PATENT DOCUMENTS

| | | |
|---|---|---|
| 8,135,847 B2 | 3/2012 | Pujol et al. |
| 8,453,163 B2 | 5/2013 | Kothamasu et al. |
| 8,473,593 B1 | 6/2013 | Graham et al. |
| 2013/0114804 A1 | 5/2013 | Do et al. |
| 2013/0132584 A1* | 5/2013 | Palladino et al. ............. 709/226 |
| 2013/0179552 A1* | 7/2013 | Bekker et al. ................ 709/223 |
| 2014/0325577 A1* | 10/2014 | Garcia Mendoza et al. .. 725/115 |

OTHER PUBLICATIONS

R. Fielding, "Architectural Styles and the Design of Network-based Software Architecture", Dissertation, University of California, Irvine, CA, 2000, pp. 1-180.

N. Lecek et al., "Applying Event-Based Framework to Support Power System Integration", Springer Publishing, Computer Science and Convergence, Lecture Notes in Electrical Engineering, vol. 114, 2012, pp. 167-181 (Abstract Only).

L. Li et al., "REST-Event: A REST Web Service Framework for Building Event-Driven Web", 2011, pp. 292-301, vol. 4, No. 3 & 4, International Journal on Advances in Networks and Services, IARIA Publishing.

M. Brevoort, "The Evented Web", de.slideshare.net, Apr. 14, 2011, pp. 1-75.

Anonymous, "Atom Syndication Format—Introduction", atomenabled.org, retrieved Nov. 10, 2014, pp. 1-10.

* cited by examiner

ACCESSING BUSINESS OBJECT RESOURCES FOR A MACHINE-TO-MACHINE COMMUNICATION ENVIRONMENT

BACKGROUND

In general the present invention relates to the fields of enterprise application software, machine-to-machine communication and enterprise application integration technology. In particular it relates to a method for accessing business object resources of a provider business application by at least one subscribed consumer application, and a corresponding machine-to-machine communication environment. Still more particularly, the present invention relates to a data processing program and a computer program product for accessing business object resources of a provider business application by at least one subscribed consumer application.

The trend to design, build and provide RESTful Web-APIs (Application-Programming-Interfaces) for business functionality is a success factor for enterprise applications in the future. REST (Representational State Transfer) is an architectural style, not a technology that describes several constraints to be applied when building Web-APIs. The web today works on the REST principles using HTTP (Hypertext Transfer Protocol) as application protocol.

Enterprise applications are either already using or are starting to use HTTP interfaces the REST way. One problem is that such a RESTful interface is not meant to call back a client because of its statelessness. The server doesn't maintain a list of clients but clients are expected to keep track of their state. A web-based business application is often confronted with customer requirements demanding that internal application business events should trigger an external system. This use case is not supported by a true RESTful API, except for polling which is only as consistent as the polling period. So in pure RESTful APIs there is no built-in solution to trigger events to connected clients. This is intended in REST interfaces and not a limitation.

A further problem comes from client SOAP (Simple Object Access Protocol) web services in the requesting applications. Often products are polluted by several customer specific implementations of consumer module interfaces like interfaces of ERP (Enterprise Resource Planning) systems. Each customer has different ERP interfaces using different technologies which lead to a huge combination of web service customized implementations in the products. Only a small proportion of such customized implementations are reusable. The maintainability and extendibility of such a product can be highly limited.

Furthermore, an application that generates information should—as the responsible system of that information—provide business interfaces of the functional domain with the correct scope and granularity. It should not be the other way round that the system being informed has to implement that interface. Also an application should clearly state which interactions are possible with it and which services can be offered.

In known solutions to these problems a general convention is to use polling by the client, which works perfectly with REST in the web, because of the caching capabilities of HTTP. Further a Web service client is implemented calling the system to be triggered directly, e.g. via SOAP (Simple Object Access Protocol) or REST. Also WS (Web service) reliable messaging and addressing like SOAP is used, which tends to act like a messaging solution.

In the enterprise world most access by users or systems to an application are protected, and a user or machine needs to authenticate before an access to the Web-API is allowed. So on these known solutions caching does not work for security reasons and therefore polling approaches become too expensive.

Therefore a substitution to polling is needed that informs a client and/or system of changes in the server application. This can be done by building out additional web services to call the clients, but this development effort will occur on the application side for implementing the client service. So for each client additional customized code within the product or an adapter would have to be built and supported, which does not scale with a large number of different clients.

Another known solution uses middleware that combines and implements custom interfaces and can include a message bus. Using such middleware solutions to adapt to customers specific interfaces moves or only temporarily solves the problem but it does not solve it in terms of reusability, maintainability and extendibility as it does not provide a process to approach the resolution of problems. Instead a second application has to be customized and continuously maintained leading to higher complexity and costs.

SUMMARY

In one embodiment of the present invention, a method and/or computer program product accesses business object resources of a provider business application by at least one consumer application via web protocol. At least one business event occurring in the provider business application, which the at least one consumer application is authorized to subscribe to, is identified. Each identified business event is assigned to at least one corresponding business object resource. Access to the business object resource is implemented as a RESTful application programming interface call. A uniform resource identifier is generated for accessing the business object resource affected by an occurring defined business event. At least one event message is created for the occurring defined business event, wherein the at least one event message comprises the uniform resource identifier for accessing the business object resource assigned to the business event. The at least one event message is published, via a message broker, to all subscribed consumer applications, such that subscribed consumer applications receive the at least one event message including the uniform resource identifier as message content, and wherein subscribed consumer applications, which are identified as being interested in contextual information of the occurred business event, call the RESTful application programming interface to access the affected business object resource using the uniform resource identifier.

In one embodiment of the present invention, a system for accessing business object resources of a provider business application comprises: a provider system running a provider business application with at least one business module; and a consumer system running at least one consumer application subscribed to the provider business application; wherein at least one consumer application accesses business object resources of the provider business application via web protocol; wherein access to the business object resources is implemented as RESTful application programming interface; wherein each business module comprises an event message generator for creating event messages representing defined business events generated by the provider business application and including a uniform resource identifier for accessing an assigned business object resource, affected by an occurring business event; wherein a message broker is connected to each business module and to each subscribed consumer application and publishes the event messages to all subscribed consumer applications; wherein the subscribed consumer applications receive the event message including the uniform resource identifier; and wherein subscribed consumer applications interested in the occurred business event call the RESTful application programming interface of the provider business application to access the affected business object resource using the uniform resource identifier.

BRIEF DESCRIPTION OF THE SEVERAL VIEWS OF THE DRAWINGS

A preferred embodiment of the present invention, as described in detail below, is shown in the drawings, in which.

DETAILED DESCRIPTION

Figure 1:
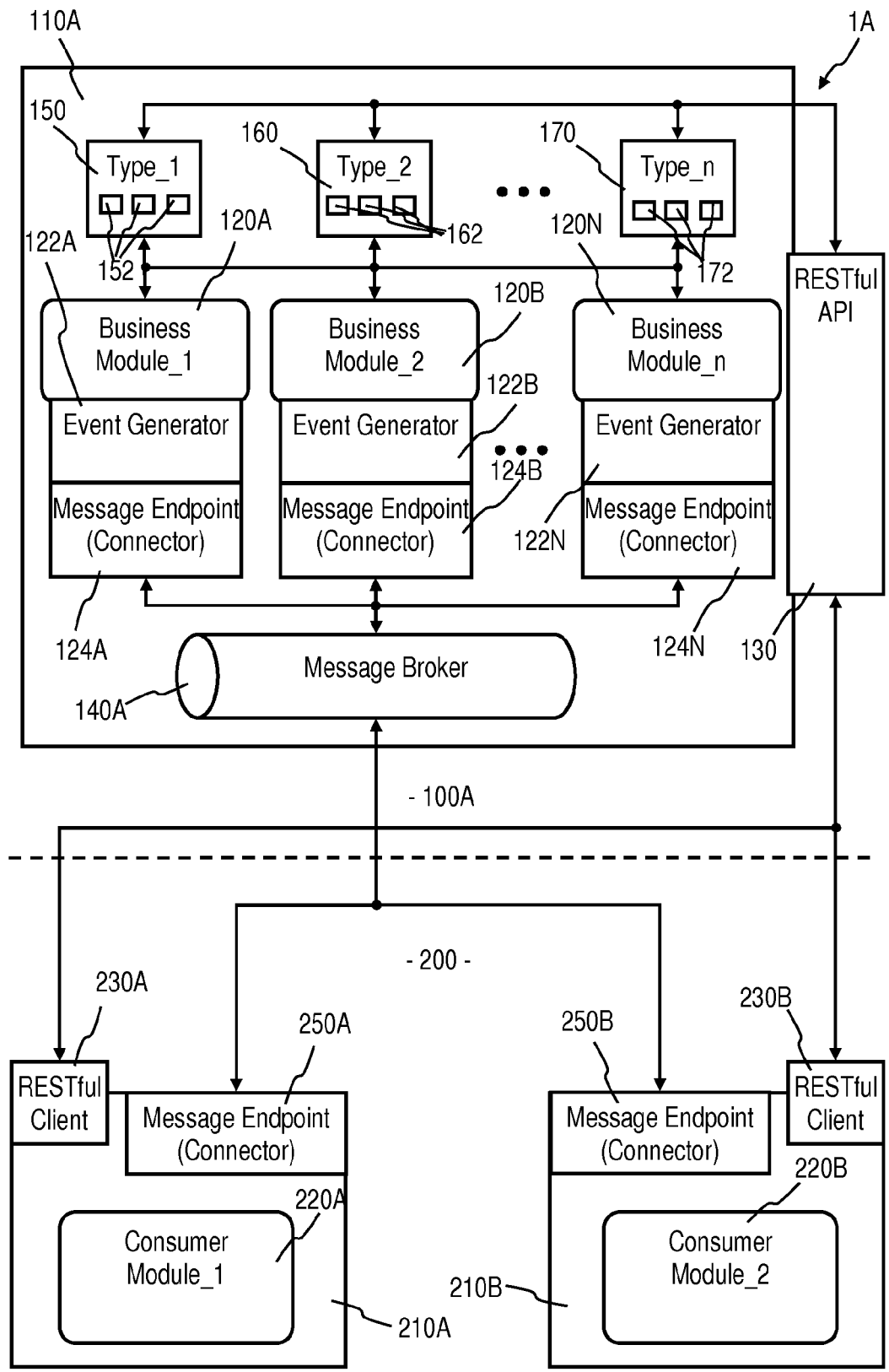
FIG. 1 is a schematic block diagram of a machine-to-machine communication environment, in accordance with a first embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
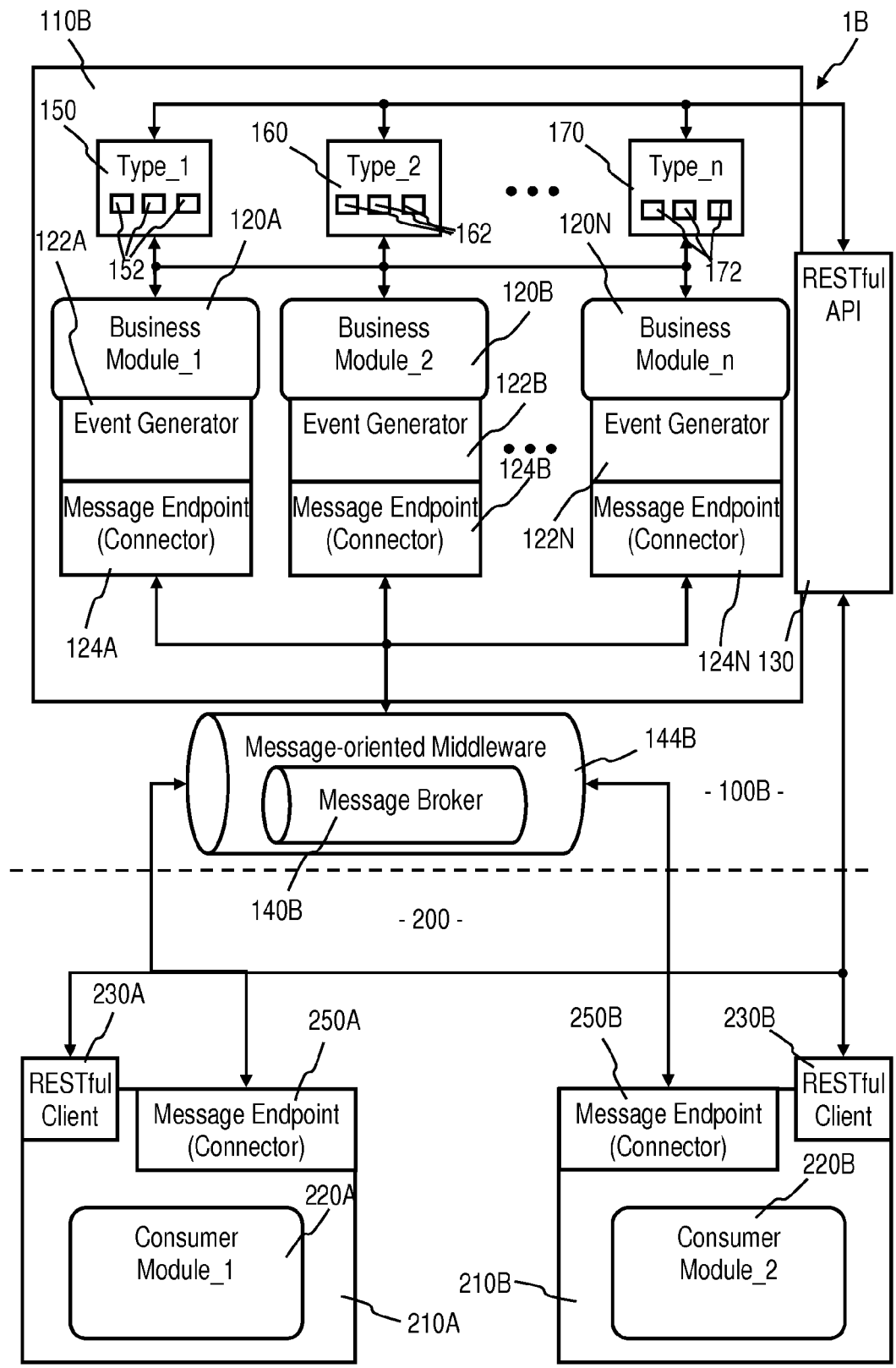
FIG. 2 is a schematic block diagram of a machine-to-machine communication environment, in accordance with a second embodiment of the present invention.

FIG. 1 shows a machine-to-machine communication environment with a client server system, in accordance with a first embodiment of the present invention; FIG. 2 shows a machine-to-machine communication environment, in accordance with a second embodiment of the present invention; and FIG. 3 shows a machine-to-machine communication environment, in accordance with a third embodiment of the present invention.

Figure 3:
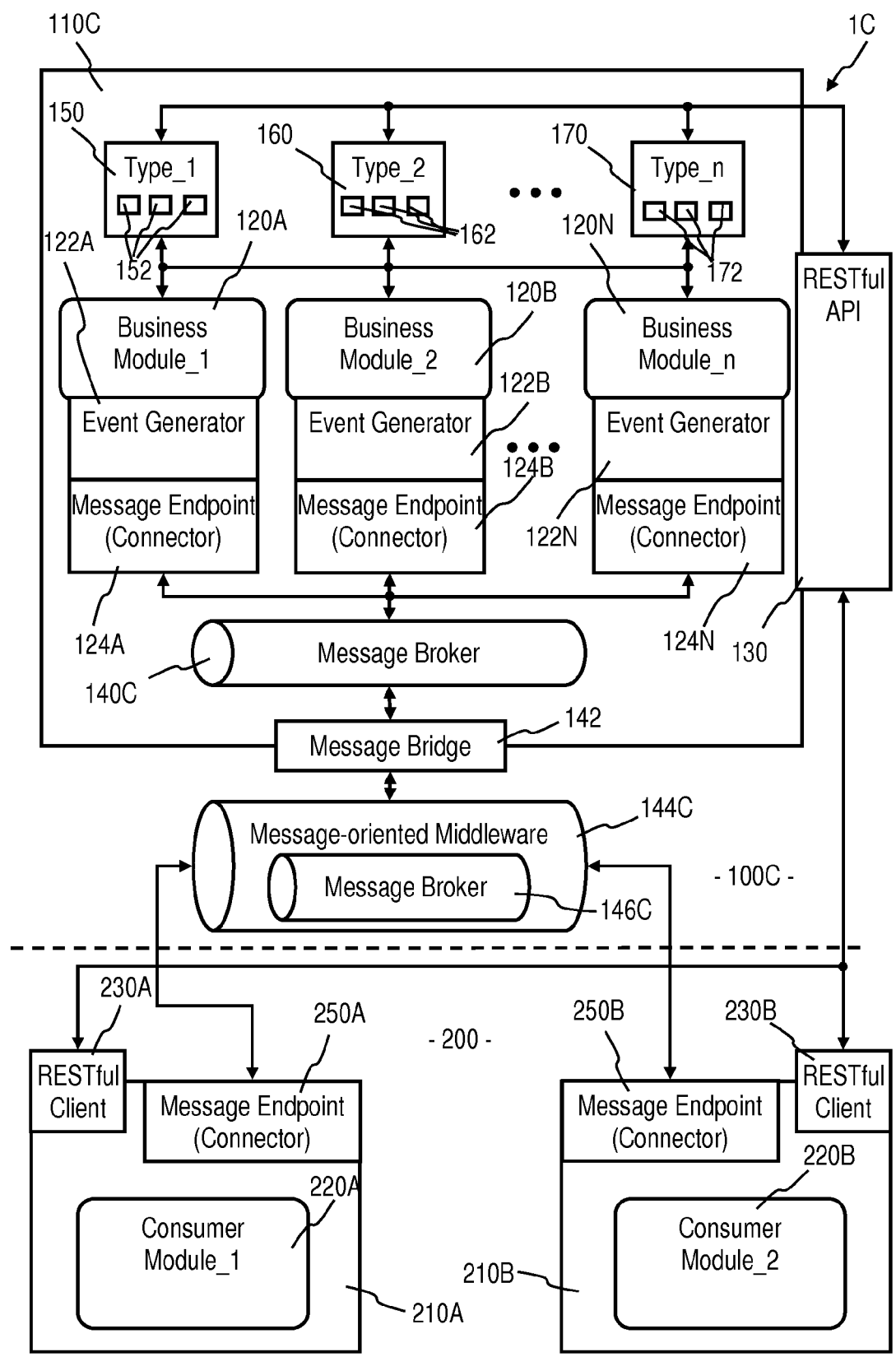
FIG. 3 is a schematic block diagram of a machine-to-machine communication environment, in accordance with a third embodiment of the present invention.

Referring to FIGS. 1 to 3, the shown embodiments of the present invention employ a machine-to-machine communication environment comprising a provider system 100A, 100B, 100C running a provider business application 110A, 110B, 110C with at least one business module 120A, 120B, 120N and a consumer system 200 running at least one consumer application 210A, 210B subscribed to the provider business application 110A, 110B, 110C. The at least one consumer application 210A, 210B accesses business object resources 152, 162, 172 of the provider business application 110A, 110B, 110C via web protocol. The access to the business object resources 152, 162, 172 is implemented as RESTful application programming interface 130. Each business module 120A, 120B, 120N comprises an event message generator 122A, 122B, 122N for creating event messages representing defined business events generated by the provider business application 110A, 110B, 110C and including a uniform resource identifier for accessing an assigned business object resource 152, 162, 172, affected by an occurring business event. A message broker 140A, 140B, 140C is connected to each business module 120A, 120B, 120N and to each subscribed consumer application 210A, 210B and publishes the event messages preferably to all subscribed consumer applications 210A, 210B. The subscribed consumer applications 210A, 210B receive the event message including the uniform resource identifier, and only subscribed consumer applications 210A, 210B interested in the occurred business event call the RESTful application programming interface 130 of the provider business application 110A, 110B, 110C to access the affected business object resource 152, 162, 172 using the uniform resource identifier.

In the shown embodiments three different types of resources 150, 160, 170 are used, wherein each resource type 150, 160, 170 comprises a number of business object resources 152, 162, 172.

In the shown embodiments the message broker 140A, 140B, 140C is implemented as Java Message Service (JMS) broker publishing the event messages to the subscribed consumer applications 210A, 210B. The subscribed consumer applications 210A, 210B use a standard HTTP implementation 230A, 230B to access the business object resources 152, 162, 172, which perform at least one of the following web protocol functions with the accessed business object resource 152, 162, 172: GET, POST, PUT or DELETE.

Referring to FIGS. 1 to 3, in the shown embodiments of the present invention the provider business application 110A, 110B, 110C comprises a business context sensitive mechanism as part of the event message generator 122A, 122B, 122N mapping the business event to at least one of the business object resources 152, 162, 172 describing the business object involved and generating a hyperlink to the corresponding business object resources 152, 162, 172. Each event message comprises hyperlink and content type information of the affected business object resources 152, 162, 172. In the shown embodiments of the present invention the provider business application 110A, 110B, 110C uses a HTTP content type header for versioning of the business object resources 152, 162, 172, wherein different versions of the business object resources 152, 162, 172 are assigned to different content type headers and a standard content type is used to call the newest version of the business object resource 152, 162, 172.

Referring to FIG. 1, in the machine-to-machine communication environment 1A, according to the first embodiment of the present invention, the message broker 140A is embedded in the provider business application 110A of the provider system 100A, and the subscribed consumer applications 210A, 210B are connected directly to the provider application's message broker 140A.

Referring to FIG. 2, in the machine-to-machine communication environment 1B, according to the second embodiment of the present invention, the message broker 140B is embedded in a stand-alone message-oriented middleware 144B deployed outside of the provider system 100B, and the subscribed consumer applications 210A, 210B are connected directly to the message broker application 140B of the stand-alone message-oriented middleware 144B.

Referring to FIG. 3, in the machine-to-machine communication environment 1C, according to the third embodiment of the present invention, a first message broker 140C is embedded in the provider business application 110C of the provider system 100C and connected via an additional message-oriented middleware 144C to the subscribed consumer applications 210A, 210B, wherein the additional message-oriented middleware 144C comprises a second message broker 146C. In the third embodiment the first message broker 140C and the second message broker 146C of the additional message-oriented middleware 144B communicate via a message bridge 142 adapting and translating the communication messages.

Figure 4:
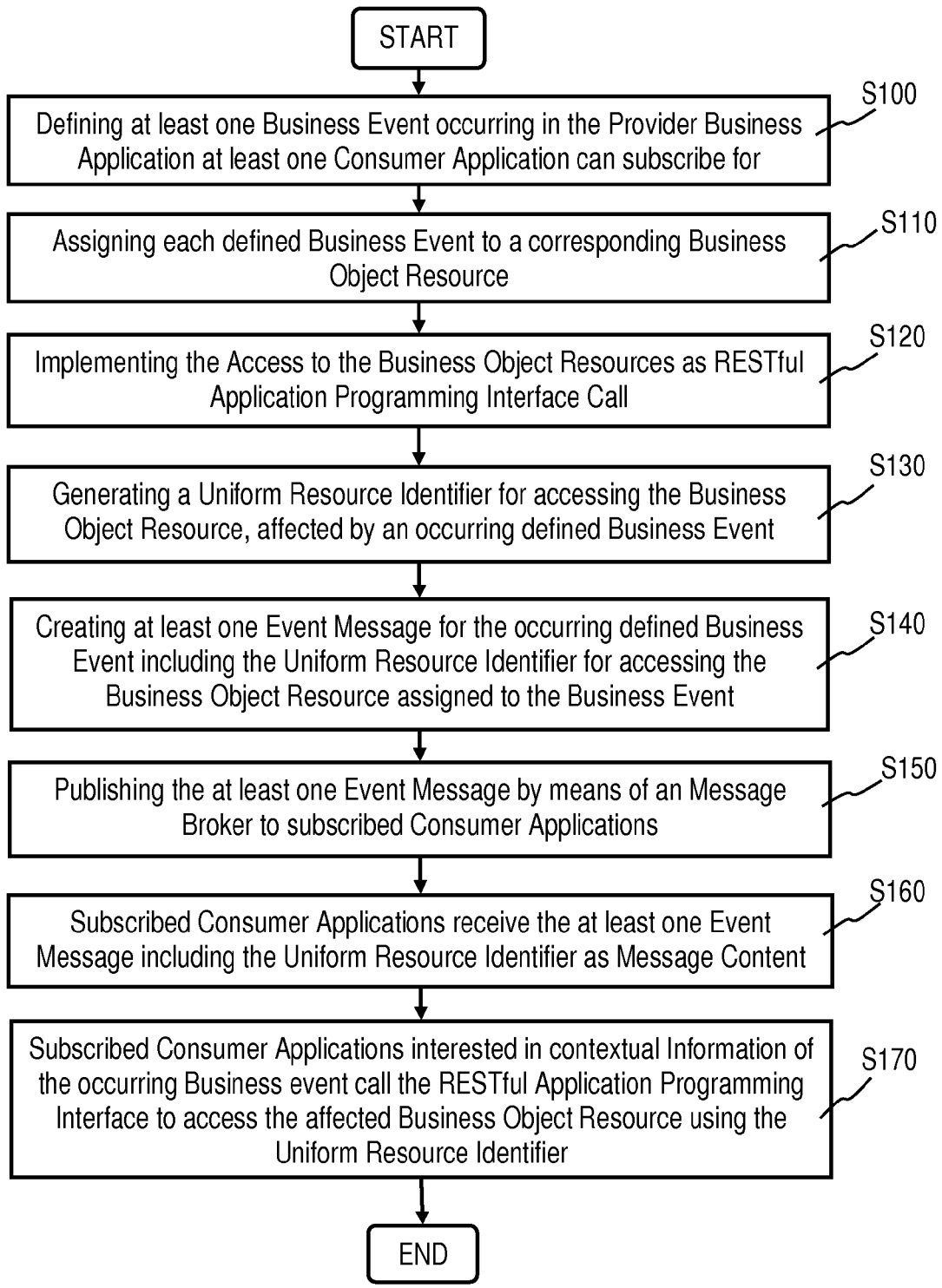
FIG. 4 is a schematic flow diagram of a method for accessing business object resources of a provider business application by at least one subscribed consumer application via web protocol, in accordance with an embodiment of the present invention.
Figure 5:
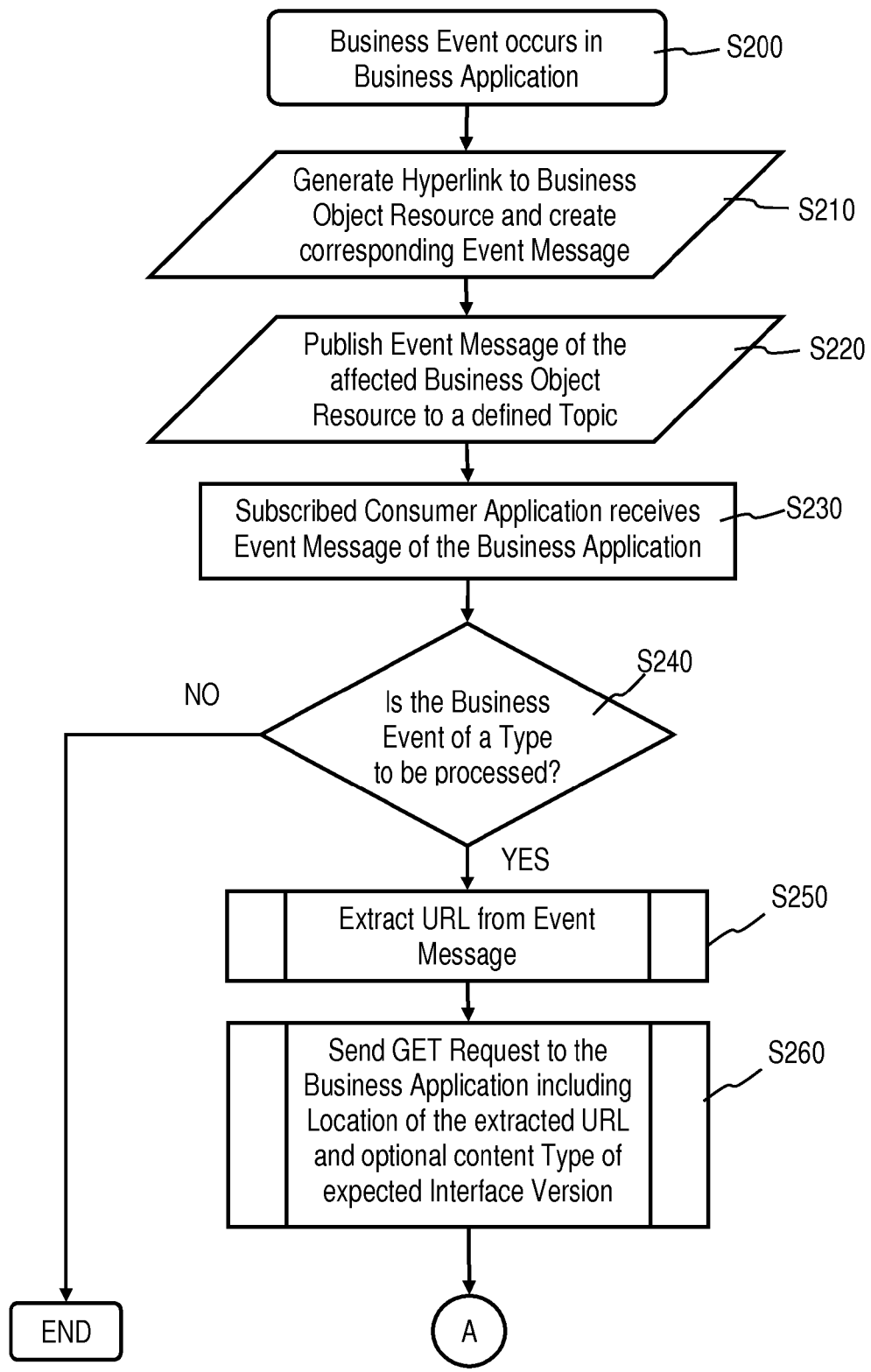
FIGS. 5 and 6 is a more detailed schematic flow diagram of the method for accessing business object resources of a provider business application by at least one subscribed consumer application via web protocol, in accordance with an embodiment of the present invention.
Figure 6:
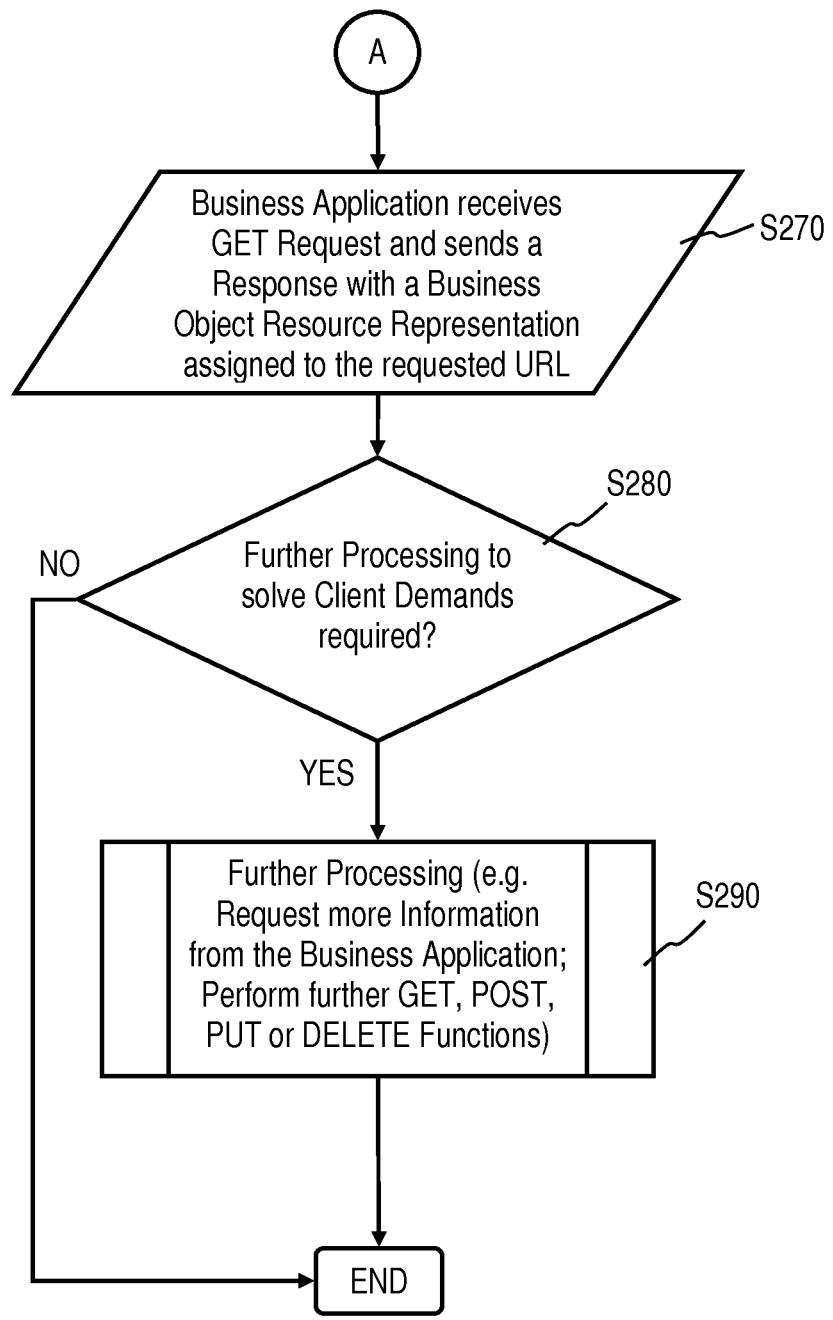

FIG. 4 shows a method for accessing business object resources 152, 162, 172 of a provider business application 110A, 110B, 110C by at least one consumer application 210A, 210B via web protocol, in accordance with an embodiment of the present invention, FIGS. 5 and 6 show the method for accessing business object resources 152, 162, 172 of a provider business application 110A, 110B, 110C by at least one subscribed consumer application 210A, 210B via web protocol in greater detail.

Referring to FIG. 4, in step S100 at least one business event occurring in the provider business application 110A, 110B, 110C the at least one consumer application 210A, 210B can subscribe for is defined. In step S110 each defined business event is assigned to a corresponding business object resource 152, 162, 172. In step S120 access to the business object resource 152, 162, 172 is implemented as RESTful application programming interface call. In step S130 a uniform resource identifier for accessing the business object resource 152, 162, 172 affected by an occurring defined business event is generated. In step S140 at least one event message for the occurring defined business event including the uniform resource identifier for accessing the business object resource 152, 162, 172 assigned to the business event is created. In step S150 at least one event message is published to all subscribed consumer applications 210A, 210B by means of a message broker 140A, 140B, 140C. In Step S160 the subscribed consumer applications 210A, 210B receive the at least one event message including the uniform resource identifier as message content; and in step S170 subscribed consumer applications 210A, 210B interested in contextual information of the occurred business event call the RESTful application programming interface 130 to access the affected business object resource 152, 162, 172 using the uniform resource identifier.

Referring to FIGS. 5 and 6, in step S200 a defined business event occurs in the business application 110A, 110B, 110C. In step S210 a hyperlink to the corresponding business objects resource 152, 162, 172 is generated and a corresponding event message is created. In step S220 the event message of the affected business object resource to a defined topic is published. In step S230 the subscribed consumer applications 210A, 210B receive the event message of the business application 110A, 110B, 110C. In step S230 the subscribed consumer applications 210A, 210B checks, if the occurred business event is of a type to be processed. If the occurred business event is not of a type to be processed by the receiving subscribed consumer application 210A, 210B, the subscribed consumer application 210A, 210B ignores the occurred business event and the process ends. If the occurred business event is of a type to be processed by the receiving subscribed consumer application 210A, 210B, the subscribed consumer application 210A, 210B extracts the uniform resource identifier from the event message in step S250. In step S260 the subscribed consumer application 210A, 210B sends a GET request to the business application 110A, 110B, 110C including the location of the extracted uniform resource identifier and optional content type of the expected interface version. In step S270 the business application 110A, 110B, 110C receives the GET request and sends a response with a business object resource representation assigned to the requested uniform resource identifier. If no further processing to solve client demands is required the process is ended. If further processing is required in step S280 the process continues with step S290 for further processing, e.g. requesting more information from the business application 110A, 110B, 110C; performing further GET, POST, PUT or DELETE Functions, etc.

The core idea is to apply embodiments of the present invention to processes in integration scenarios where an event driven model is used for fetching business information. The business or enterprise application 110A, 110B, 110C is using a message broker 140A, 140B, 140C or an enterprise service bus (ESB), for example, to publish business events as Java Message Service (JMS) event messages asynchronously to subscribed client or consumer applications 210A, 210B.

The published event message contains the least amount of information of the affected business objects, namely the Hyperlink and content-type to the affected resources 152, 162, 172. The content-type will also take responsibility of the service's version and the Hyperlink remains unchanged. The Hyperlink is generated in the context of the business event and identifies the affected business resource 152, 132, 172 changed and/or affected by the business event. The business or enterprise application 152, 162, 172 provides a secured—for example protected by SSO (Single Sign-on), HTTP authentication mechanisms, SAML, OAuth, or LTPA token—web application programming interface (Web-API) that may be used by an authenticated system offering all relevant business information. The used Web-API is RESTful in terms of using stable uniform resource identifiers, statelessness, HATEOAS (Hyperlinks as the engine of application state) and has a resource oriented design. A client or consumer application 210A, 210B receiving the JMS event message from the message broker 140A, 140B, 140C or the enterprise service bus (ESB) can use the Hyperlink to retrieve the affected resources. The client or consumer application 210A, 210B uses its preferred representation type as content-type parameter when invoking the request on the uniform resource identifier. No UDDI (Universal Description, Discovery and Integration) is needed as the service location is clearly stated in the event message's hyperlink. As REST uses stable uniform resource locators, versioning does not break clients, since the event message will always contain the correct link, even if the Web-API has a newer version. The content-type can be used to distinguish differently versioned application programming interfaces, e.g. for version 1: application/vnd.ibm-emptoris.slm-v1.0+xml; for version 2: application/vnd.ibm-emptoris.slm-v2.0+xml. The system to be informed uses a Java Message Service endpoint 250A, 250B for listening to business events and a standard HTTP implementation 230A, 230B to retrieve resource representations. Java Message Service specification and corresponding Java Message Service implementations assure delivery for event messages to all subscribed client or consumer application 210A, 210B. Client or consumer applications 210A, 210B are requesting information in a stateless manner via HTTP which is a key to scalability. The implementation of embodiments of the present invention is easy and generic; since HTTP is the most widely understood and used application protocol. The implementation of embodiments of the present invention is reliable, since Java Message Service assures message delivery and is standard in many programming languages. Further implementation of embodiments of the present invention is flexible and effective, since client or consumer applications 210A, 210B can choose to ignore event messages or to process them and call the REST Web-API in contrast to state of the art solutions, e.g. SOAP (Simple Object Access Protocol) Push Message style, where sending the complete set of information with each message is performed.

As stated above the business application 110A, 110B, 110C publishes the business event using the message broker, e.g. implementing JMS (Java Message Service) that also generates the hyperlink to the affected business resource 152, 162, 172. The business application 110A, 110B, 110C where the business event occurs can reliably generate a link to the affected resource 152, 162, 172. Therefore the business application 110A, 110B, 110C implements a link factory or a link generator 122A, 122B, 122N that takes the business object and the business event type as arguments. The business object is the object that was generally affected. The business event type describes what happened with the business object. Based on the event type a specific JMS event message is generated that will be published to the correct topic. The JMS message content will be filled with the relevant information of the business object. Here just the least possible information to identify the object uniquely is the preferred approach. The hyperlink to the affected resource 152, 162, 172 can be generated when using a uniform resource identifier (URI) template within the business application 110A, 110B, 110C which is globally maintained. The URI template contains a constant where the resource Id of the business object will be included. The result is the hyperlink to the business object resource 152, 162, 172 that was touched by the business event. The hyperlink will be added to the content of the JMS event message and the business application 110A, 110B, 110C publishes the message to the intended topic. Subscribed consumer applications 210A, 210B are now able to receive the event messages and query for the business object resources 152, 162, 172.

The process is even stable for different versions of the business object resources 152, 162, 172 which can reside behind the same uniform resource identifier (URI). Assuming that there are two versions of the business object resource 152, 162, 172, wherein a first version V1 is supporting text fields in the response, and a second version V2 is supporting text fields and number fields in the response. One way for versioning would be using the version in the uniform resource locator (URL) "/v1/.../" or "/v2/.../" wherein v1 represents the first version V1 and v2 represents the second version V2. This obviously would make some difficulties when assuming there are several client or consumer applications 210A, 210B using the same business module 120A, 120B, 120C, because the business module 120A, 120B, 120C don't know which version link "/v1/.../" or "/v2/.../" to send to the client or consumer application 210A, 210B in the JMS event message. The client or consumer application 210A, 210B might not be able to handle the first version V1 and the second version V2, because it was implemented to exactly use one version V1 or V2.

A uniform resource identifier is kept constant and a RESTful solution would be to version via the HTTP content type header. So the intended resource uniform resource identifier would be requested by the client or consumer application 210A, 210B with the correct header, for example content-type "application/ . . . −v1.0+ . . . " or "application/ . . . −v2.0+ . . . ". This way the business module 120A, 120B, 120C can deliver new versions of the interfaces without breaking existing clients and the whole invention also scales over multiple customer installations.

The versioning of application programming interfaces (APIs) with HTTP content-type is the preferred scenario. Supposing there is a business object resource offered by a business application under uniform resource identifier (URI) "/business-module/resourceId". The allowed method is HTTP GET.

In a first point "A" of time the business application offers the business application resource "/business-module/resourceId" with a first content-type "application/ . . . −v1.0+xml". There is an implementation of a first client A that can query the business application resource "/business-module/resourceId" by sending a HTTP GET request with the accepted first content-type "application/ . . . −v1.0+xml". The business application will return the exact representation of the requested first business application resource content-type "application/ . . . −v1.0+xml" to client A, which understands the first business application resource content-type "application/ . . . −v1.0+xml" and can correctly handle it.

After the first point A of time, in a second point B of time the business application adds features to the business application resource "/business-module/resourceId" that would break the existing first client A but include highly demanded features for a second client B. The uniform resource identifier (URI) of the business application resource "/business-module/resourceId" will stay unchanged but the business application will offer a new second content-type "application/ . . . −v2.0+xml" which can be used by the second client B now. If the business application receives a HTTP GET "/business-module/resourceId" with the second content-type "application/ . . . −v2.0+xml" then it will return the new representation of the business application resource containing the new features needed.

As the first client A still uses the first content-type "application/ . . . −v1.0+xml", the business application returns the older version that the first client A still understands. The uniform resource identifier (URI) remains unchanged, but the first client A and the second client B both receive different representations of the business application resource. To make it more convenient for clients who always want to receive the newest representation of a business application resource, the standard content-types as "application/xml" or "application/json" will translate to the newest representation of the corresponding content-type.

For example: A third client C requesting the application programming interface in the second point B of time using HTTP GET "/business-module/resourceId" with a third content-type "application/xml" will receive the second version V2 representation of the second content-type "application/ . . . −v2.0+xml". Embodiments of the present invention keep the uniform resource locator stable, and the JMS event message generated by the business application sends out the uniform resource identifier of the business application resource and the requesting client uses the content type it understands.

In the following a real world example from customer requirements to supplier lifecycle management is described. IBM Emptoris Supplier Lifecycle Management (SLM) is a modular, scalable, and proven solution that provides comprehensive support for end to end supplier management needs, and gathers valuable information for a client's supplier base. Referring to FIGS. 1 to 3, multiple enterprise resource planning (ERP) systems are represented by consumer applications 210A, 210B and integrated with supplier lifecycle management (SLM) application represented by provider business application 110A, 110B, 110C to fetch supplier information that is further used by external systems to make key decisions regarding future business with the suppliers. So a customer 200 maintains an enterprise resource planning system 210A, 210B that clears supplier records for business and provisions a vendor ID. The customer enterprise resource planning 220A, 220B is connected to an enterprise service bus (ESB). On customer side there are least possible integration, customizing or programming efforts. The strategic supply management suite is integrated to the customer environment. A business workflow is established such that the enterprise resource planning system 210A, 210B generate a vendor ID for a supplier that was on-boarded in supplier lifecycle management (SLM) 110A, 110B, 110C. The enterprise resource planning system 210A, 210B uses a set of potentially several hundred relevant supplier fields which are a mixture of information from the supplier lifecycle management (SLM) application 110A, 110B, 110C and other strategic supply management (SSM) suite applications, potentially contracts management, sourcing, and spend. The strategic supply management suite is also represented by enterprise applications 110A, 110B, 110C. The created vendor ID should be synchronized to the strategic supply management (SSM) suite applications 110A, 110B, 110C.

The aforementioned supplier fields are customizable within a questionnaire of a SLM business module 120A, 120B, 120C in the supplier lifecycle management (SLM) application 110A, 110B, 110C. Information is collected through these questionnaires for each supplier. This information can be retrieved by a third party system or manually by authorized users via the Web-API 130. The supplier lifecycle management (SLM) application 110A, 110B, 110C comprises a message broker 140A, 140B, 140C, e.g. a JMS (Java Message Service) message broker, and a mechanism that converts business (functional) events, e.g. a questionnaire got filled by a supplier user, into technical events, i.e. an event message (JMS message). Additionally, the supplier lifecycle management (SLM) application 110A, 110B, 110C provides a REST interface 130 that contains supplier lifecycle management business information which allows to collect the filled questionnaires. The Java Message Service event message works as a trigger which is sent to each client application 210A, 210B subscribed to the enterprise service bus or the message broker. The Java Message Service event message contains only the necessary information that a mediator which could be a middleware component like the enterprise service bus itself, an IBM Integration Bus, IBM CastIron, or some other middleware component uses to request the REST interfaces 130 of the supplier lifecycle management (SLM) application 110A, 110B, 110C for the exact data retrieval. As REST defines a resource oriented design, where each resource is addressable, the technology bridge is that the Java Message Service event message includes the hyperlink to the business application resource—in this case the link to the supplier's filled questionnaire.

The Mediator component easily follows the hyperlink and parses the result, typically in XML or JSON representation, and translates and/or adapts the information fitting into the client or customer deployment 200. The mediator sends all information in the correct format, order, size, technology and timing according to the intended process to the responsible applications (e.g. ERP systems) and receives the result. The result from the customer enterprise resource planning 220A, 220B is then applied to the supplier lifecycle management (SLM) application 110A, 110B, 110C by providing the generated supplier vendor ID via Web-API 130.

Another scenario of the processes described before can be solved using an enterprise service bus, like IBM Integration Bus v9, where supplier lifecycle management 110A, 110B, 110C is integrated with multiple consumer enterprise resource planning systems 210A, 210B and each requires data based on a particular information within supplier lifecycle management 110A, 110B, 110C and possibly other applications. Here the customer 200 has a couple of enterprise resource planning systems 210A, 210B that are responsible for different kind of supplier information. The supplier lifecycle management 110A, 110B, 110C is requested to only update specific enterprise resource planning systems 210A, 210B based on supplier information. For example based on the supplier's purchase volume (PVO) for a specific internal organization, the supplier should be added to either a first customer enterprise resource planning system ERP1 or a second customer enterprise resource planning system ERP2 but not to both. As this kind of requirement varies by business information, in this example it is purchase volume (PVO) business information, it might also be based on other or a combination of functional fields, a category or user information, and number of customer enterprise resource planning systems to be integrated, there is no way to build up a standard interface(s) that solve this out of the box from a supplier lifecycle management 110A, 110B, 110C product perspective using prior art solutions. Using the process disclosed here, those requirements are generally solvable.

In the supplier lifecycle management 110A, 110B, 110C supplier information is gathered and JMS (Java Message Service) event messages are published when business events like content or information changes or content processing occur. The supplier lifecycle management 110A, 110B, 110C comprises a RESTful Web API 130 for its functional domain represented by collection and instance resources, an answer sheet collection resource allowing to search for specific answer sheets e.g. for a specific supplier, and an answer sheet instance resource containing the detailed information of an answer sheet.

The middleware is the enterprise service bus, for example, that implements supplier lifecycle management adapters and enterprise resource planning system adapters. A first customer enterprise resource planning system ERP 1 is only fed with supplier information with a purchase volume (PVO) smaller than 10.000 €, for example. A second customer enterprise resource planning system ERP2 is only fed with supplier information with a purchase volume (PVO) equal to or greater than 10.000 €, for example.

In case of the functional event of a released answer sheet for a supplier, the supplier lifecycle management 110A, 110B, 110C publishes a Java Message Service event message for this functional event. The enterprise service bus is subscribed to the supplier lifecycle management 110A, 110B, 110C and processes them accordingly by validation and routing. If a business event is of the correct type to be processed the middleware authenticates with a machine user to the supplier lifecycle management 110A, 110B, 110C and for example obtains a LTPA token that is used in subsequent requests to the Web API of the supplier lifecycle management 110A, 110B, 110C. A WebSphere application server (WAS) returns the LTPA token for correct authentication. The enterprise service bus stores the LTPA token and makes it globally available within the integration environment. Exactly one predefined entry point URL (Uniform Resource Locator) is given to the enterprise service bus which is used for the initial search of the affected resource. The enterprise service bus builds a request to the supplier lifecycle management 110A, 110B, 110C using the entry point URL and a request parameter code i.e. that is the exact value that was provided in the Java Message Service event message. The supplier lifecycle management 110A, 110B, 110C returns the XML representation of the requested answer sheet search resource. This collection resource already contains the direct link to the answer sheet instance resource; therefore the enterprise service bus does not need to know the uniform resource locator template for creation. The enterprise service bus uses JAXB to create Java objects of the XML response which can be easily queried or manipulated. The enterprise service bus extracts the answer sheet uniform resource locator from the Java object and prepares a request to the answer sheet resource containing the LTPA token. The enterprise service bus requests the answer sheet resource. The supplier lifecycle management 110A, 110B, 110C sends back the XML representation and the enterprise service bus again marshals the result into a Java object using JAXB. The enterprise service bus extracts from the marshaled Java object the given answer to the purchase volume (PVO) question. The enterprise service bus checks weather the answer is < or >=10.000€. The enterprise service bus updates only the affected enterprise resource planning system.

An improved method for accessing business object resources (152, 162, 172) of a provider business application (110A) by at least one consumer application (210A, 210B)

via web protocol comprises the steps of: Defining at least one business event occurring in the provider business application (110A) to that the at least one consumer application (210A, 210B) can subscribe for; assigning each defined business event to at least one corresponding business object resource (152, 162, 172); implementing access to the business object resource (152, 162, 172) as RESTful application programming interface call; generating a uniform resource identifier for accessing the business object resource (152, 162, 172) affected by an occurring defined business event; creating at least one event message for the occurring defined business event including the uniform resource identifier for accessing the business object resource (152, 162, 172) assigned to the business event; publishing the at least one event message by means of a message broker (140A) to all subscribed consumer applications (210A, 210B); wherein subscribed consumer applications (210A, 210B) receive the at least one event message including the uniform resource identifier as message content; and wherein subscribed consumer applications (210A, 210B) interested in contextual information of the occurred business event call the RESTful application programming interface (130) to access the affected business object resource (152, 162, 172) using said uniform resource identifier.

The technical problem underlying the present invention is to provide a method for accessing business object resources of a provider business application by at least one subscribed consumer application and a corresponding machine-to-machine communication environment, which are able to improve accessing to business object resources of a provider business application and to solve the above mentioned shortcomings and pain points of prior art access to business object resources.

Accordingly, in an embodiment of the present invention a method for accessing business object resources of a provider business application by at least one consumer application via web protocol comprises the steps of: Defining at least one business event occurring in the provider business application that the at least one consumer application can subscribe for; assigning each defined business event to at least one corresponding business object resource; implementing access to the business object resource as RESTful application programming interface (also known as Web-API) call; generating a uniform resource identifier (URI) for accessing the business object resource affected by an occurring defined business event; creating at least one event message for the occurring defined business event including the uniform resource identifier for accessing the business object resource assigned to the business event; publishing the at least one event message by means of a message broker to all subscribed consumer applications; wherein subscribed consumer applications receive the at least one event message including the uniform resource identifier as message content; and wherein subscribed consumer applications interested in contextual information of the occurred business event call the RESTful application programming interface to access the affected business object resource using the uniform resource identifier.

In further embodiments of the present invention, a message endpoint implementation is used to publish the event messages to the subscribed consumer applications via a message-oriented middleware.

In further embodiments of the present invention, standard HTTP implementation is used to access business object resources by the subscribed consumer applications via the RESTful application programming interface.

In further embodiments of the present invention, the subscribed consumer applications perform at least one of the following web protocol functions with the accessed business object resource: GET, POST, PUT or DELETE.

In further embodiments of the present invention, each event message comprises at least one hyperlink according uniform resource identifier specification and HTTP content type header information of the affected business object resources, wherein the at least one hyperlink is generated in context to the business event.

In further embodiments of the present invention, versioning of the business object resources is performed by using the HTTP content type header for calling the RESTful application programming interface; wherein different versions of the business object resources are assigning to different content type headers.

In further embodiments of the present invention, a standard content type is used to call the newest version of a corresponding business object resource.

In further embodiments of the present invention, the provider business application provides an authentication mechanism usable by subscribed consumer applications for authentication purposes.

In another embodiment of the present invention, a machine-to-machine communication environment comprises a provider system running a provider business application with at least one business module and a consumer system running at least one consumer application subscribed to the provider business application, wherein at least one consumer application accesses business object resources of the provider business application via web protocol; wherein access to the business object resources is implemented as RESTful application programming interface; wherein each business module comprises an event message generator for creating event messages representing defined business events generated by the provider business application and including a uniform resource identifier for accessing an assigned business object resource, affected by an occurring business event; wherein a message broker is connected to each business module and to each subscribed consumer application and publishes the event messages to subscribed consumer applications; wherein the subscribed consumer applications receive the event message including the uniform resource identifier; and wherein subscribed consumer applications interested in contextual information of the occurred business event calls the RESTful application programming interface of the provider business application to access the affected business object resource using the uniform resource identifier.

In further embodiments of the present invention, the message broker is connected directly or via an additional message-oriented middleware to the subscribed consumer applications.

In further embodiments of the present invention, the message broker is implemented via Java Message Service implementation publishing the event messages to the subscribed consumer applications, wherein the subscribed consumer applications use a standard HTTP implementation to access business object resources, wherein the subscribed consumer applications perform at least one of the following web protocol functions with the accessed business object resource: GET, POST, PUT or DELETE.

In further embodiments of the present invention, the provider business application comprises a business context sensitive mechanism mapping the business event to at least one of the business object resources describing the business object involved and generating a hyperlink to the corresponding business object resources, wherein each event message comprises hyperlink and content type information of the affected business object resources.

In further embodiments of the present invention, the provider business application uses a HTTP content type header for versioning of the business object resources; wherein different versions of the business object resources are assigned to different content type headers, wherein a standard content type is used to call the newest version of the business object resource.

In another embodiment of the present invention, a data processing program for execution in a data processing system comprises software code portions for performing a method for accessing business object resources of a provider business application by at least one subscribed consumer application when the program is run on the data processing system.

In yet another embodiment of the present invention, a computer program product stored on a computer-usable medium, comprises computer-readable program means for causing a computer to perform a method for accessing business object resources of a provider business application by at least one subscribed consumer application when the program is run on the computer.

All in all, embodiments of the present invention are reliable, scalable, stable and flexible to cover a wide range of enterprise application integration use cases in the field of enterprise application platforms. The proposed process allows the business application to provide a generic standard interface without additional custom parts. There is a minimum effort for implementation on client or consumer side. The provided out of the box process, which can be used by clients to build their integration, only uses standardized technology. The JMS (Java Message Service) messages created by the business application are very small making an efficient use of bandwidth. In addition, it makes the understanding and handling of these messages easier as the subscribing client does not have to handle and/or parse big messages. The subscribing client only needs to care about the information it is interested in. The rest can simply be ignored. It saves a reasonable amount of overhead created if alternatively the client applications, e.g. ERP (Enterprise Resource Planning) systems will poll this information or it is being sent in push style. The subscribing client can purely use the Hyperlink of the content of the event message to retrieve information of that event, without using a service discovery or message routing middleware. The subscribing client doesn't need to know how to generate a link to the functional domain of the interested information because the link is generated and delivered by the message service broker based on the business event of the business application. As a consequence the server is decoupled from the client. By giving the link generation responsibility to the business application the interface can completely change, or completely new resources can be addressed. This is because the client doesn't follow a URI (Uniform Resource Identifier) template generation rule that might be obsolete suddenly. As consequence the client is decoupled from the server.

Embodiments of the present invention use content negotiation for interface versioning. This assures a uniform interface, i.e. consistent URI's (Uniform Resource Identifiers)) based on the principles of HATEOAS (Hyperlinks as the engines of application state). This in turn allows subscribing clients to continue using the publishing application's interfaces without any changes required for any version changes in interfaces of business modules. Further the customer business process is built in the middleware and not in a functional application. The functional application notifies subscribed clients and allows for data retrieval but doesn't coordinate or orchestrate web service calls nor does it implement remote services.

In prior art solutions a service discovery mechanism is needed, because of the not addressable nature of for example SOAP (Simple Object Access Protocol) endpoints. Further no stable uniform resource identifiers (URIs) are used, as new functionality was added as new methods which were translated into the URI (Uniform Resource Identifier). So a new version needs a new method and/or a new URI.

In summary, to improve the short comings and problems of prior art solutions outlined in the background section embodiments of the present invention introduce how a JMS (Java Message Service) API (Application-Programming-Interface) and a RESTful Web API (Application-Programming-Interface) can be used in an integration process that allows for high reliability, stability, scalability, extendibility and even unforeseen integration use cases. It seamlessly solves versioning by leveraging HTTP content types, for example. As only mature technologies are used, the process ensures stable and reliable integrations.

Embodiments of the present invention provide a fixed set of notifications and/or messages clients can subscribe to, so that polling is not required and information are not created on request but by a business process. There is no occurrence of providing specific information for easy service discovery with the JMS event, i.e. URL of the service to retrieve.

Advantageously in embodiments of the present invention a publishing application embeds a message broker, e.g. a message broker implementing JMS (Java Message Service) specification, for message publication; an URI (Uniform Resource Identifier) generation mechanism that automatically generates Hyperlinks to functional resources; a set of RESTful interfaces representing the functional domain. The message broker publishes messages to subscribed applications containing the URL (Uniform Resource Locator) to the specific RESTful interface resource that is directly connected to the event. The generation mechanism is a business context sensitive algorithm that maps a business event to the functional resource describing the business object involved. The functional resource is versioned via HTTP content-types that decouple the interface version from the resource URL and a new version is a new resource representation.

A corresponding subscribing consumer application is subscribed to a message topic, that describes the functional domain the client is interested in, and uses the resource URL of a content of a message published on the used topic without further service lookup, e.g. UDDI (Universal Description, Discovery and Integration), or factoring via URL (Uniform Resource Locator) templates, to retrieve the information it is interested in. This assures decoupling of publisher and subscriber and makes the need of a service discovery solution obsolete. The subscribing client will still work irrespective of the deployment of a new version which would be identified by a new content-type in the publishing application. This assures a stable service versioning concept support clients working on different API (Application-Programming-Interface) versions at the same time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for accessing business object resources of a provider business application by at least one consumer application via web protocol, the method comprising:
    identifying, by one or more processors, at least one business event occurring in said provider business application that said at least one consumer application is authorized to subscribe to;
    assigning, by one or more processors, each identified business event to at least one corresponding business object resource;
    implementing, by one or more processors, access to said business object resource as a RESTful application programming interface call;
    generating, by one or more processors, a uniform resource identifier for accessing said business object resource affected by an occurring defined business event;
    creating, by one or more processors, at least one event message for said occurring defined business event, wherein said at least one event message comprises said uniform resource identifier for accessing said business object resource assigned to said business event; and
    publishing, by one or more processors, said at least one event message, via a message broker, to all subscribed consumer applications, wherein said subscribed consumer applications receive said at least one event message including said uniform resource identifier as message content, and wherein said subscribed consumer applications, which are identified as being interested in contextual information of said occurred business event, call said RESTful application programming interface call to access said affected business object resource using said uniform resource identifier.

2. The method according to claim 1, wherein a message endpoint implementation is used to publish said at least one event message to said subscribed consumer applications via a message-oriented middleware.

3. The method according to claim 1, wherein a Hypertext Transfer Protocol (HTTP) implementation is used to access a business object resource said accessed object resource by said subscribed consumer applications via said RESTful application programming interface call.

4. The method according to claim 3, wherein said subscribed consumer applications perform at least one of the following web protocol functions with said accessed business object resource: GET, POST, PUT and DELETE.

5. The method according to claim 1, wherein each event message comprises at least one hyperlink according to a uniform resource identifier specification and HTTP content type header information of said affected business object resource, wherein said at least one hyperlink is generated within a context of said business event.

6. The method according to claim 1, further comprising:
    versioning, by one or more processors, said business object resource by using a HTTP content type header for calling said RESTful application programming interface, wherein different versions of said business object resource are assigned to different content type headers.

7. The method according to claim 6, wherein a standard content type is used to call a newest version of a corresponding business object resource.

8. The method according to claim 1, wherein said provider business application provides an authentication mechanism usable by subscribed consumer applications for authentication purposes.

9. A computer program product for accessing business object resources of a provider business application by at least one consumer application via web protocol, the computer program product comprising a computer readable storage medium having program code embodied therewith, wherein the computer readable storage medium is not a transitory signal per se, and wherein the program code is readable and executable by a processor to perform a method comprising:
    identifying at least one business event occurring in said provider business application that said at least one consumer application is authorized to subscribe to;
    assigning each identified business event to at least one corresponding business object resource;
    implementing access to said business object resource as a RESTful application programming interface call;
    generating a uniform resource identifier for accessing said business object resource affected by an occurring defined business event;
    creating at least one event message for said occurring defined business event, wherein said at least one event message comprises said uniform resource identifier for accessing said business object resource assigned to said business event; and
    publishing said at least one event message, via a message broker, to all subscribed consumer applications, wherein said subscribed consumer applications receive said at least one event message including said uniform resource identifier as message content, and wherein said subscribed consumer applications, which are identified as being interested in contextual information of said occurred business event, call said RESTful application programming interface call to access said affected business object resource using said uniform resource identifier.

10. The computer program product according to claim 9, wherein a message endpoint implementation is used to publish said at least one event message to said subscribed consumer applications via a message-oriented middleware.

11. The computer program product according to claim 9, wherein a Hypertext Transfer Protocol (HTTP) implementation is used to access a business object resource by said subscribed consumer applications via said RESTful application programming interface call.

12. The computer program product according to claim 11, wherein said subscribed consumer applications perform at least one of the following web protocol functions with said accessed business object resource: GET, POST, PUT and DELETE.

13. The computer program product according to claim 9, wherein each event message comprises at least one hyperlink according to a uniform resource identifier specification and HTTP content type header information of said affected business object resource, wherein said at least one hyperlink is generated within a context of said business event.

14. The computer program product according to claim 9, wherein the method further comprises:
    versioning said business object resource by using a HTTP content type header for calling said RESTful application programming interface, wherein different versions of said business object resource are assigning to different content type headers.

15. The computer program product according to claim 14, wherein a standard content type is used to call a newest version of a corresponding business object resource.

16. The computer program product according to claim 9, wherein said provider business application provides an authentication mechanism usable by subscribed consumer applications for authentication purposes.

17. A system for accessing business object resources of a provider business application, the system comprising:
- a provider hardware computer system running a provider business application with at least one business module; and
- a consumer hardware computer system running at least one consumer application subscribed to said provider business application;
- wherein at least one consumer application accesses business object resources of said provider business application via a web protocol;
- wherein access to said business object resources is implemented as RESTful application programming interface;
- wherein each business module comprises an event message generator for creating event messages representing defined business events generated by said provider business application and including a uniform resource identifier for accessing an assigned business object resource, affected by an occurring business event;
- wherein a message broker is connected to each business module and to each subscribed consumer application and publishes said event messages to all subscribed consumer applications;
- wherein said subscribed consumer applications receive said event messages including said uniform resource identifier; and
- wherein subscribed consumer applications interested in said occurred business event calls said RESTful application programming interface of said provider business application to access said affected business object resource using said uniform resource identifier.

18. The system according to claim 17, wherein said message broker is connected directly or via an additional message-oriented middleware to said subscribed consumer applications.

19. The system according to claim 17, wherein said message broker is implemented via a Java Message Service (JMS) implementation publishing said event messages to said subscribed consumer applications, wherein said subscribed consumer applications use an HTTP implementation to access said business object resources, and wherein said subscribed consumer applications perform at least one of the following web protocol functions with said accessed business object resource: GET, POST, PUT or DELETE.

20. The system according to claim 17, wherein said provider business application comprises a business context sensitive mechanism mapping said business event to at least one of said business object resources, wherein said mapping identifies a particular business object involved and generates a hyperlink to affected business object resources, and wherein each event message comprises hyperlink and content type information of said affected business object resources.

* * * * *